Patented Nov. 22, 1927.

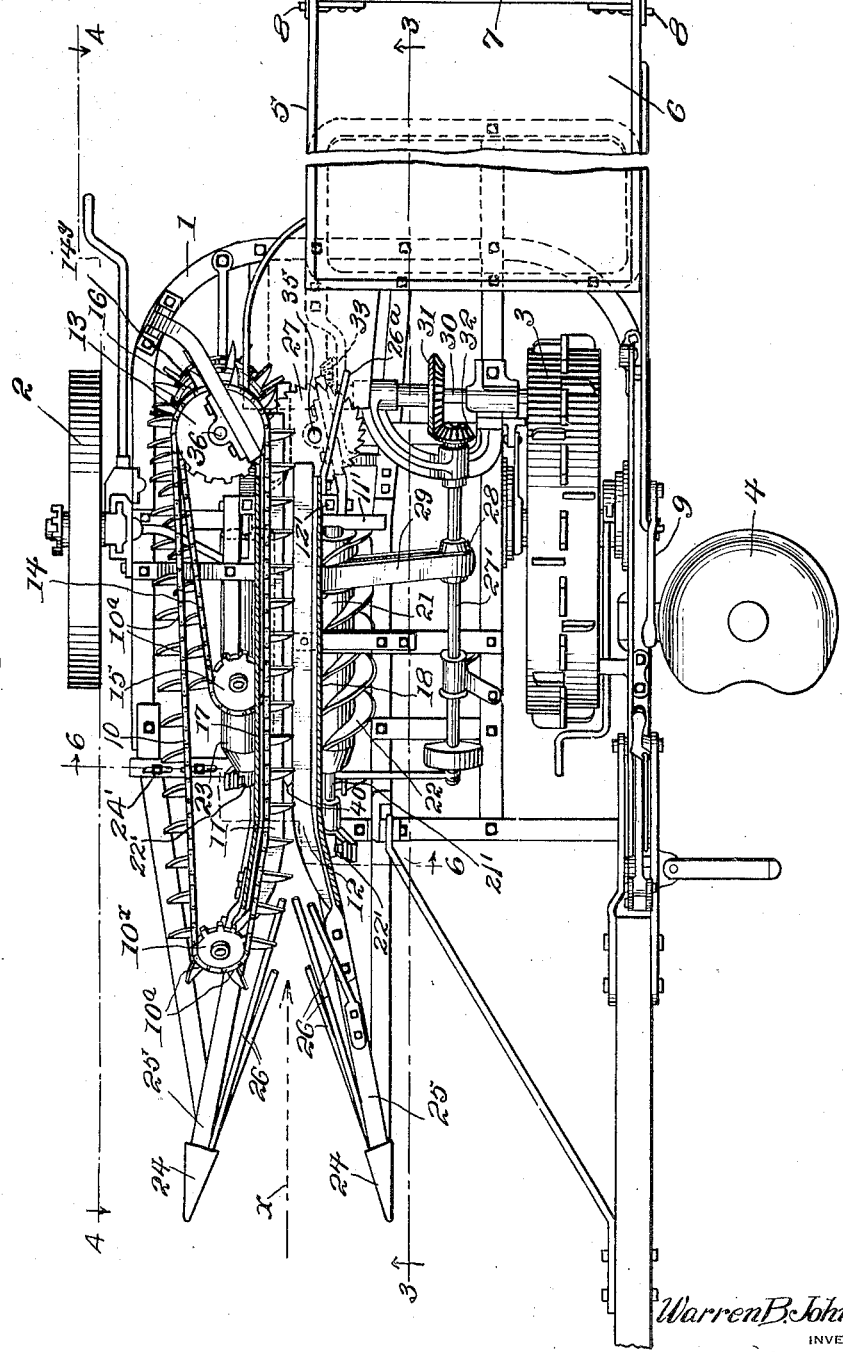

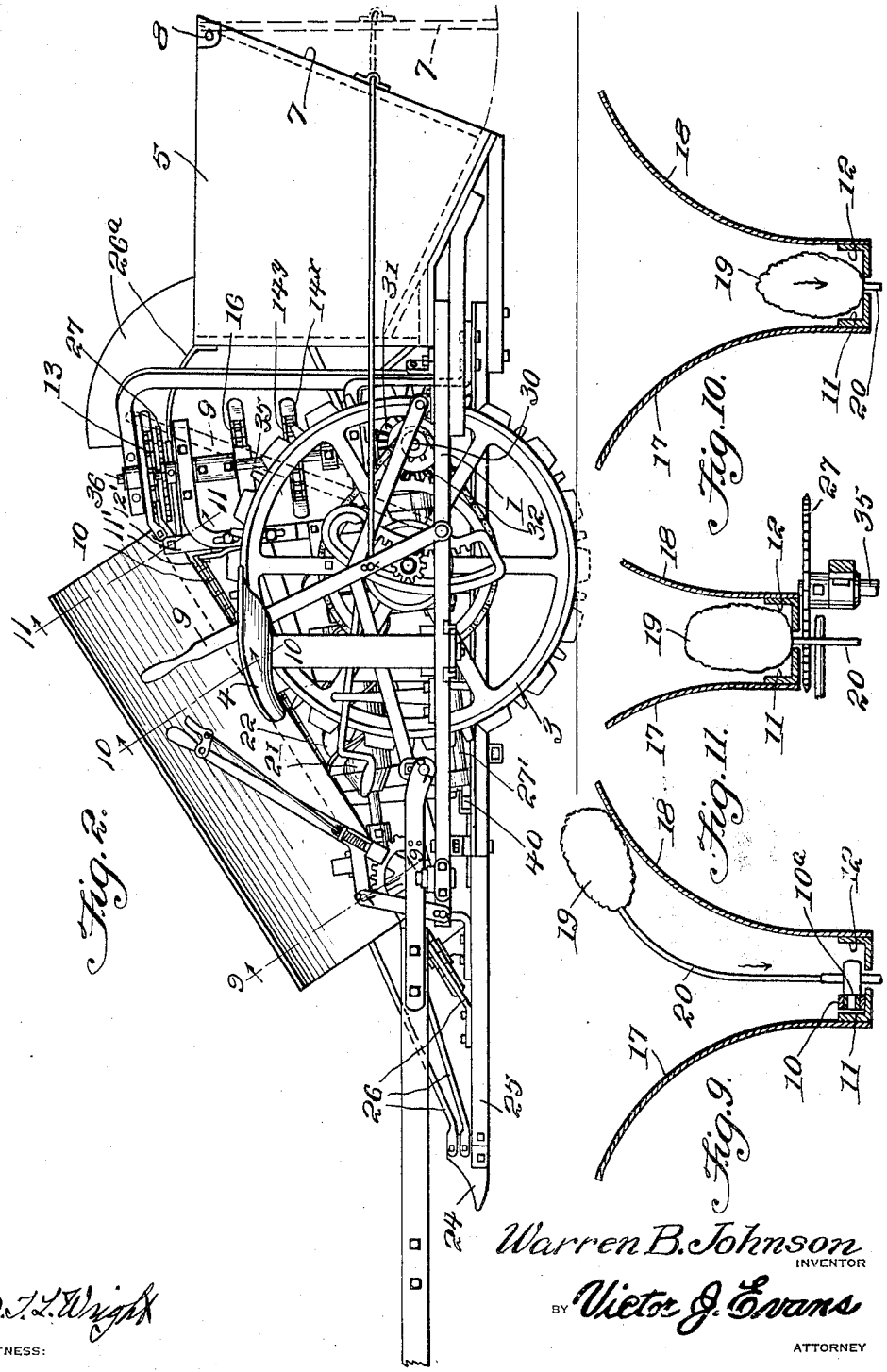

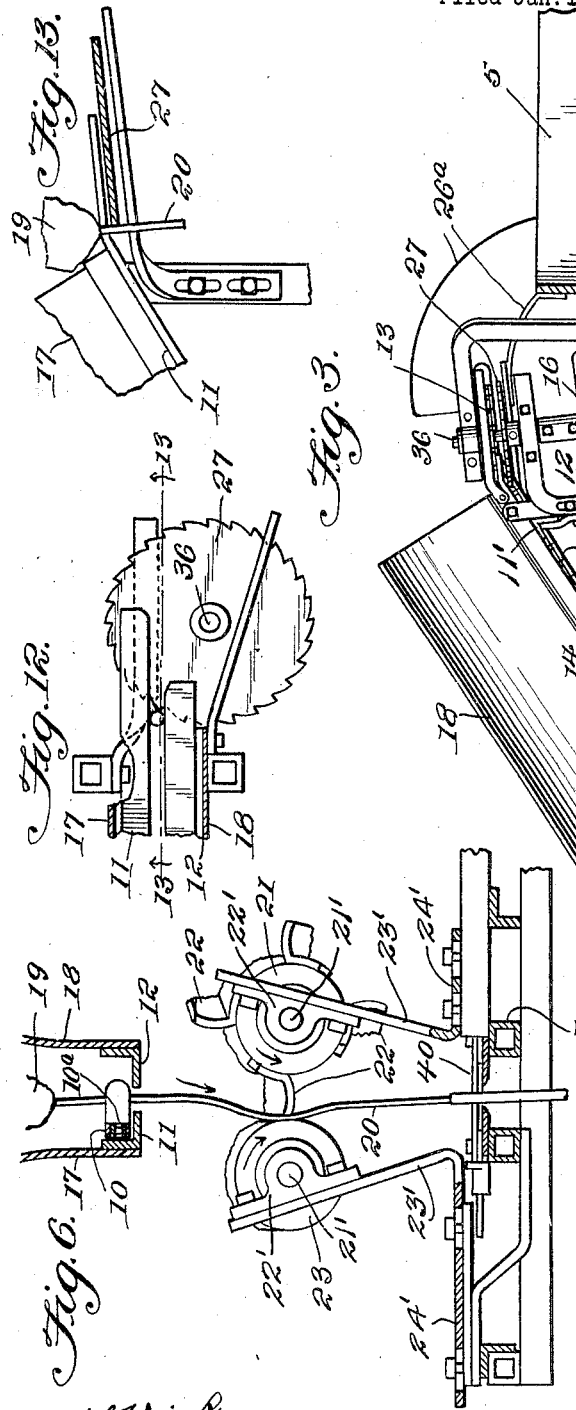

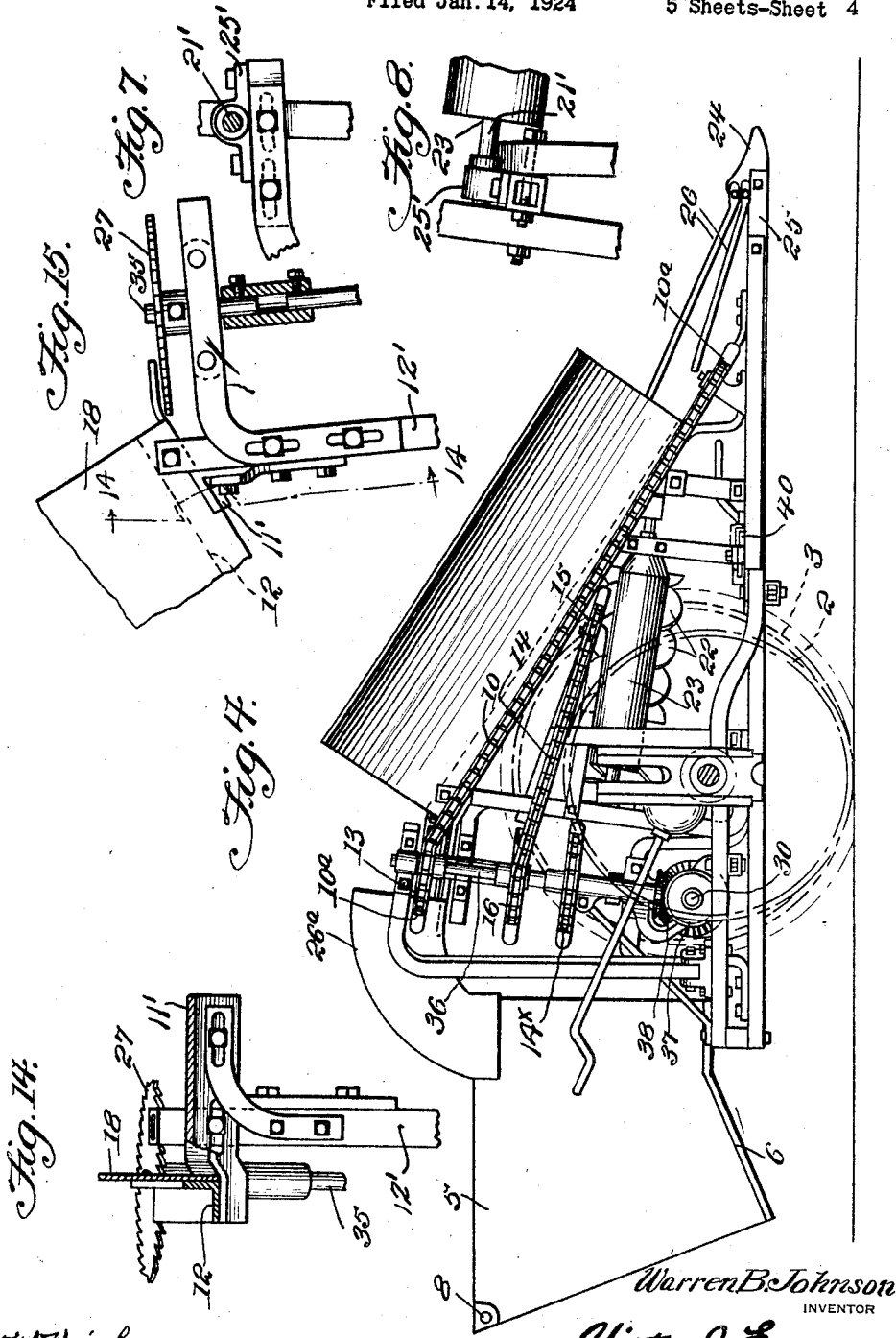

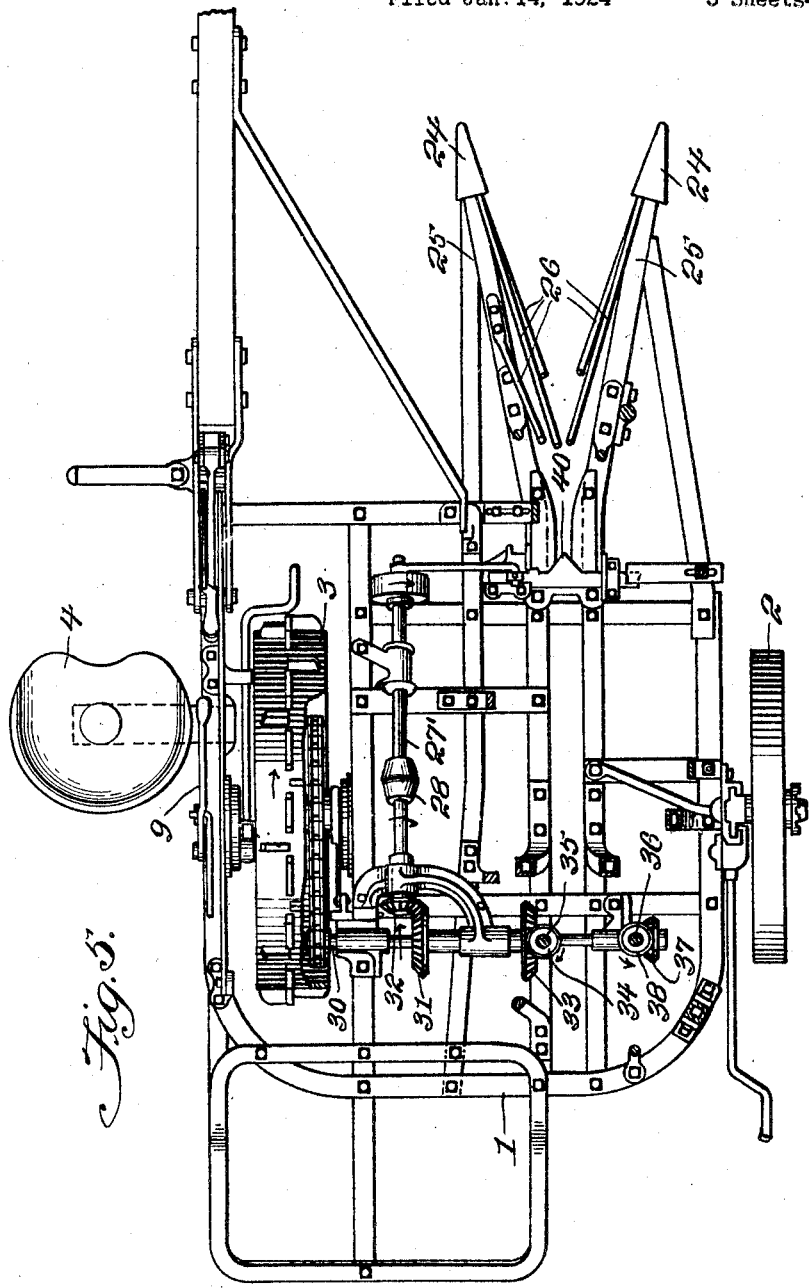

1,650,521

UNITED STATES PATENT OFFICE.

WARREN B. JOHNSON, OF LORENZO, TEXAS.

SHORT-STEM-MILO-MAIZE HEADER.

Application filed January 14, 1924. Serial No. 686,155.

The general object of my said invention is the provision of an apparatus adapted to efficiently take the heads off milo maize and the like without removing more of the stems than is the case when the milo maize and analogous crops are headed by hand.

To the attainment of the foregoing, the invention consists in the improvement as hereafter described and definitely claimed.

In the accompanying drawings, forming part of this specification:

Figure 1 is a top plan view of the apparatus constituting the preferred embodiment of my invention and showing the trough thereof in section.

Figure 2 is an elevation of the left-hand side of the apparatus.

Figure 3 is a longitudinal vertical section of the apparatus taken in the plane indicated by the line 3—3 of Figure 1.

Figure 4 is a sectional view taken on line 4—4 of Figure 1 and shows the wheels of the apparatus in dot and dash lines.

Figure 5 is a top plan view with parts shown in horizontal section and parts removed.

Figure 6 is a fragmentary sectional view illustrative of the mode of operation of the rollers and fingered chain with respect to a stalk of grain.

Figure 7 is a detail view showing one of the bearings for the idle roller.

Figure 8 is a similar view taken at right angles to Figure 7 and showing a fragmentary portion of the idle roller.

Figure 9 is a sectional view taken approximately on line 9—9 of Figure 2 and illustrating the position taken of a stalk upon entering the trough.

Figure 10 is a sectional view taken on line 10—10 of Figure 2 and showing the position of the stalk when operated upon by the rollers.

Figure 11 is a sectional view taken on line 11—11 of Figure 2 and showing the position of the stalk with respect to the circular saw and just previous of severing the head therefrom.

Figure 12 is a detail top plan view illustrating the position of the saw with relation to the end of the trough.

Figure 13 is a sectional view taken on line 13—13 of Figure 12.

Figure 14 is a sectional view taken on line 14—14 of Figure 15.

Figure 15 is a detail side elevation with parts in section and showing the means for adjusting the height of the saw and the space between the troughs.

Similar numerals of reference designate corresponding parts in all of the views of the drawings.

While designed primarily for taking the heads off milo maize, I would have it understood that my novel apparatus is also adapted for use to advantage in heading kafir corn, and any of the grain sorghums that have heads larger than the stems bearing the heads. My apparatus is also adapted to efficiently head the crops indicated even when the stems thereof are bent, distorted or are of irregular growth, and is calculated in all cases to cut short stems and reduce the waste of grain to a minimum. I would also have it understood that my novel apparatus is adapted to be adequately operated by one man and may be easily drawn by two draft animals.

Among other elements the apparatus comprises a main frame 1. The said main frame may be of the general construction illustrated or of any other construction compatible with the purpose of my invention without involving departure from the scope of the same as claimed. As illustrated the main frame 1 is supported by two wheels 2 and 3, the wheel 3 being adjustable and capable of being adjustably fixed with respect to the frame 1 in the manner common to one row corn harvesters. At 4 a driver's seat is mounted on the frame 1, and carried by said frame 1 at the rear end thereof is a receptacle 5 for grain,—i. e., milo maize heads, said receptacle having a rearwardly and downwardly pitched bottom 6, and also having a swingable rear wall 7, hinged at 8 and adapted to be opened and closed through the medium of a hand lever 9. See dotted and full lines in Figure 2. Manifestly when the wall or door 7 is opened by the operator the grain collected in the receptacle 5 will be discharged therefrom to the ground and deposited in a pile thereon.

The organized mechanism of the apparatus includes an appropriately mounted endless chain 10 arranged as shown relative to a trough through which the stalks pass. Said trough is formed by a side 11 and a side 12, which is adjustable laterally to increase or diminish the width of the passage between the sides and for this purpose I have provided slotted members 11' fixed to the side 12 and adjustably secured to uprights 12' in the manner as suggested in Figure 14 of the drawings. The side 11 serves as a guide for the chain 10 and functions to take the chain 10 from the plane of the sprocket wheel 13, which drives the chain 10, and deliver it to the plane of an idler sprocket wheel 10ˣ. The function of the endless chain 10 is to slide the stalks up the passage of the trough. Every other link of the chain 10 is a finger link 10ᵃ, and obviously I may employ as many finger links of proper size in the chain as are necessary to slide the stalks upwardly and rearwardly through the passage of the trough, the trough being inclined as illustrated. In association with the endless chain 10 I employ an endless chain 14. This chain 14 serves to prevent lagging of the lower portions of the stalks. It is mounted on a sprocket wheel 15, and is driven by a sprocket wheel 16. Combined with the sides of the trough described are outwardly flared guards 17 and 18. These guards serve to guide heads on crooked stems down into the trough after the manner shown in Figures 9, 10 and 11, the grain head in said figures being designated by 19 and the stem by 20.

Associated with the trough and the two endless chains alluded to is an inclined driven roller 21 relatively arranged as shown and equipped with a pulley 21ˣ. This roller 21 is designed to exert a downward and forward pressure on the stalks as they traverse the passage of the trough, and it is characterized by strips 22 of flexible fabric attached to its surface and as shown. The flexible strips 22, within the purview of my invention, may be of any material and of any shape to enable the driven roller 21 to perform the function ascribed to it. At 23 is an inclined idler roller which affords a shoulder against which the roller 21 works. The roller 21 and the roller 23 are each provided with a shaft 21' extending therethrough in a manner to provide projecting ends. The forward ends of the shafts 21' are mounted in bearings 22' carried by brackets including uprights 23' and base portions 24' adjustably secured to the frame in the manner as suggested in Figure 6 of the drawings. The opposite end of the shaft for the roller 23 is mounted in an adjustable bearing 25' as best shown in Figures 7 and 8. By this construction, it will be obvious that the rollers can be adjusted with respect to each other for varying the space between the same. Said roller 23 turns only when there is sufficient friction between it and the downwardly passing stalks. Located in front of the passage in the trough are forwardly divergent guides made up, by preference, of points 24, bars 25 by which the points are carried, and fingers 26, Figures 1–5.

The reference numerals 26ᵃ, 26ᵃ are spaced sheet metal strips arranged upon opposite sides of the passage as best shown in Figure 1 and designed to guide the heads into the receptacle 5, and 27 is a circular saw having the front sides of its teeth sharpened, and designed to cut the heads off the stalks or stems. The said saw 27 is designed to be readily raised and lowered to suit different conditions.

Motion is taken from the ground wheel 3, to drive the working parts described, the several driving connections being of the construction clearly illustrated or of any other construction compatible with the purpose of my invention.

As illustrated a longitudinal shaft 27' is mounted in the main frame. Said shaft is provided with a pulley 28, connected by a belt 29 with the pulley 21ˣ on the roller 21. Mounted in the main frame and disposed at right angles to the shaft 27 is a shaft 30 that is connected with and driven by the shaft of the wheel 3 in the manner well known in single row corn harvesters. Miter gears 31 and 32 connect the shafts 30 and 27; and it will also be noted that the shaft 30 is connected by miter gears 33 and 34, Figures 3 and 5, with the shaft 35 that carries the rotary saw 27. A shaft 36 that carries sprocket gears complementary to the endless chains described is connected to the shaft 30 by miter gears 37 and 38, Figure 4.

The relative arrangement of the driven roller and the idler roller to each other and to the other parts of the apparatus is clearly shown in Figure 6, and by reference to said Figure 6 it will be ascertained that the flexible strips 22 on the driven roller 21 wipe past the side of the idler roller 23 and by so doing deflect the stems or stalks and move the latter downwardly.

The operation of my novel apparatus will be understood when it is stated that incident to the traverse of the apparatus along a row, stalks enter the apparatus along the dotted line x in Figure 1, between the divergent guides described, and are conducted to the point where they are caught by the fingers of the endless chain 10, and are moved thereby longitudinally of the passage in the trough. At the point 40 the stalks are cut by an appropriate cutting device comparatively low and are detached from the ground. The lower portions of the severed stalks then enter between the idler roller 23 and the driven, strip-bearing roller 21 where sufficient downward pressure is exerted on the stalk, Figure 6, to draw the stalks but not the heads downwardly through the passage of the trough. At the point shown in Figure 10 the heads are in the trough and the stalks are below the trough. Here the rotary saw 27 cuts the heads from the stalks, whereupon the heads drop upon said saw and are thrown by centrifugal action into the receptacle 5. The stalks from which the heads have been cut as stated are thrown out of the apparatus by the endless chain 14 and by a supplemental endless chain 14^x equipped with finger links and deriving motion from a sprocket wheel 14^y.

Having described my invention, what I claim and desire to secure by Letters Patent, is:—

1. A short stem heading apparatus of the character described comprising an inclined trough including sides and a bottom which is formed with a longitudinal passage, said trough being provided with outwardly flared ends at its lower end, divergent bars extending from the flared ends, points secured to the outer end of said guards, fingers projecting inwardly from said points for guiding stalks to said passage, means for moving the stalks rearwardly in said passage, means for severing the stalks adjacent the ground, means below the trough for drawing severed stalks downwardly through said passage incident to the rearward movement of said stalks in said passage and said last mentioned means formed by longitudinally extending inclined spaced rollers mounted for adjustment with respect to each other, flexible fabric strips secured in spiral formation to one of said rollers, a pulley on the last mentioned roller, means trained about said pulley for operating the same and means for severing heads from said severed stalks following said rearward and downward movement of said stalks.

2. A short stem heading apparatus of the character described comprising a wheeled frame, a trough carried by said wheeled frame and including sides and a bottom which is provided with a longitudinally disposed passage, outwardly flared guards secured to and rising from said sides, cutting means mounted for movement across the passage adjacent the lower end of said trough, spaced parallel inclined rollers, brackets adjustably secured to said frame, uprights included in said brackets, bearings secured to said uprights and receiving the rollers, a pulley formed with one of said rollers, means trained about said pulley for rotating the same, flexible strips secured to the last mentioned roller and being arranged in spiral formation thereon, said strips being adapted to engage the other of said rollers for rotating the same, a circular saw mounted for vertical adjustment and disposed adjacent the upper end of the trough, a receptacle carried by the frame laterally and rearwardly of the saw, and sheet metal strips extending from the upper ends of the guards as and for the purpose specified.

In testimony whereof I affix my signature.

WARREN B. JOHNSON.